(12) United States Patent
Persson et al.

(10) Patent No.: US 8,976,692 B2
(45) Date of Patent: Mar. 10, 2015

(54) D.C. OFFSET ESTIMATION

(75) Inventors: Jonas Persson, Furulund (SE); Sven Mattisson, Bjärred (SE)

(73) Assignee: ST-Ericsson SA, Plan-les-Ouates (CH)

(*) Notice: Subject to any disclaimer, the term of this patent is extended or adjusted under 35 U.S.C. 154(b) by 404 days.

(21) Appl. No.: 13/522,662

(22) PCT Filed: Jan. 20, 2011

(86) PCT No.: PCT/EP2011/050753
§ 371 (c)(1),
(2), (4) Date: Aug. 27, 2012

(87) PCT Pub. No.: WO2011/089184
PCT Pub. Date: Jul. 28, 2011

(65) Prior Publication Data
US 2012/0314602 A1  Dec. 13, 2012

Related U.S. Application Data

(63) Continuation-in-part of application No. 12/690,549, filed on Jan. 20, 2010, now abandoned.

(51) Int. Cl.
| | |
|---|---|
| *H04L 27/36* | (2006.01) |
| *H04B 1/04* | (2006.01) |
| *H04B 1/30* | (2006.01) |
| *H04L 25/06* | (2006.01) |
| *H04L 27/26* | (2006.01) |
| *H04L 27/00* | (2006.01) |

(52) U.S. Cl.
CPC .............. *H04B 1/0475* (2013.01); *H04B 1/302* (2013.01); *H04L 25/061* (2013.01); *H04L 27/364* (2013.01); *H04L 27/2647* (2013.01); *H04L 2027/0016* (2013.01)

USPC .......................................................... 370/252

(58) Field of Classification Search
CPC ...................................................... H04W 24/00
See application file for complete search history.

(56) References Cited

U.S. PATENT DOCUMENTS

| | | |
|---|---|---|
| 5,241,702 A | 8/1993 | Dent |
| 7,020,216 B1 * | 3/2006 | Lipp ............................ 375/308 |
| 7,072,420 B2 | 7/2006 | Persson |

(Continued)

FOREIGN PATENT DOCUMENTS

| | | |
|---|---|---|
| EP | 1835626 A1 | 9/2007 |
| WO | WO 2011089184 A1 * | 7/2011 |

OTHER PUBLICATIONS

EPO, Int'l Search Report in PCT/EP2011/050753, Jun. 22, 2011.

(Continued)

*Primary Examiner* — Andrew Lai
*Assistant Examiner* — Hoyet H Andrews
(74) *Attorney, Agent, or Firm* — Piedmont Intellectual Property

(57) ABSTRACT

A combination of a phase shifter, a measurement receiver, and an offset estimator enable the d.c. offset in the transmit path of a quadrature transmitter to be distinguished from the d.c. offset in the measurement receiver. The measurement receiver performs a first measurement on the transmit path output with a "normal" phase shift of 0 degrees and 90 degrees for in-phase (I) and quadrature (Q) components, and a second measurement with a "special" phase shift for the I and Q components. In one embodiment, the "special" phase shift for the I and Q components is 180 degrees and 270 degrees, respectively.

15 Claims, 5 Drawing Sheets

(56) References Cited

U.S. PATENT DOCUMENTS

| | | |
|---|---|---|
| 7,266,359 B2 | 9/2007 | Chen et al. |
| 7,356,318 B2* | 4/2008 | Sowlati ............. 455/168.1 |
| 8,090,036 B2* | 1/2012 | Okada et al. ........... 375/260 |
| 2006/0003717 A1* | 1/2006 | Sowlati ............. 455/168.1 |
| 2007/0092023 A1 | 4/2007 | Kang et al. |
| 2008/0063113 A1 | 3/2008 | Gao et al. |
| 2009/0041161 A1 | 2/2009 | Jian et al. |
| 2009/0161778 A1* | 6/2009 | Okada et al. ........... 375/260 |
| 2009/0302919 A1* | 12/2009 | Sasaki ................. 327/255 |
| 2012/0314602 A1* | 12/2012 | Persson et al. ......... 370/252 |

OTHER PUBLICATIONS

EPO, Written Opinion in PCT/EP2011/050753, Jun. 22, 2011.
EPO, Int'l Prelim.Report on Patentability in PCT/EP2011/050753, May 14, 2012.

* cited by examiner

D.C. OFFSET ESTIMATION

TECHNICAL FIELD

This invention relates to electronic communication systems and more particularly to signal offset compensation in such systems.

BACKGROUND

Many current electronic communication systems use quadrature modulation schemes, which use in-phase (I) and quadrature (Q) signal components, and do not have constant envelopes. Examples of such communication systems are cellular radio telephone systems that use wideband code division multiple access (WCDMA), orthogonal frequency division multiple access (OFDMA), and their variants. Thus, part of the communicated information is encoded in the amplitude (envelope) of the transmitted signal and part is encoded in the phase of the transmitted signal.

To avoid distorting the communicated information, the power amplifier (PA) and various other components of the radio transmitter have to be linear, which is to say for example that the functional relationship between the output power of the PA and the input power of the PA is a straight line for all possible power levels. In addition, the phase shift of the input signal for example through the PA has to be constant for all possible power levels.

Departures from amplitude linearity and constant phase introduce distortion into the communicated signal, such as spectral broadening that can disturb adjacent channels. Amplitude/phase distortion (vector distortion) in the transmitter can also increase the bit error rate (BER) of the communication system, e.g., degrading the audio quality of a voice call or reducing the speed of an internet connection.

In general, the likelihood of proper performance can be increased by including in the transmitter a measurement receiver (MRX) that samples the transmitted signal and generates a compensation signal is fed back to the modulator, PA, and/or other transmitter components to correct the transmitter output signal. Such an arrangement 100 is depicted in FIG. 1, which shows an antenna 102, a coupler 104, an amplifier 106, a quadrature modulator 108, and an MRX 110. The amplifier 106 and modulator 108 can be considered the "transmit path" of the arrangement 100, which it will be understood typically includes oscillators and other components not shown. As seen in the figure, the MRX 110 samples the transmitted signal generated by the transmit path through the operation of the coupler 104 and provides a compensation signal to the modulator 108.

The MRX 110 can be used for several purposes, one of which is measurement, or more generally estimation, of the direct-current (d.c.) offset between I and Q components in the amplifier 106 and quadrature modulator 108. To achieve that purpose correctly, the I/Q d.c. offset of the MRX itself typically must be negligible (ideally, it should be zero) or at least well known. Otherwise, the I/Q d.c. offset of the transmit path will generally not be correctly estimated.

European Patent Application Publication No. EP 1 835 626 A1 by Ishikawa et al. describes a d.c. offset correction value estimating unit that estimates a d.c. offset correction value based on a transmit signal that is produced by a quadrature modulator. A signal level detecting unit detects the signal level of an input signal, a weight factor calculating unit computes a weight factor for the d.c. offset correction value in accordance with the signal level, and a weighting unit assigns a weight to the d.c. offset correction value in accordance with the weight factor. A d.c. offset in the transmit signal is compensated by using the thus weighted d.c. offset correction value.

U.S. Patent Application Publication No. US 2007/0092023 by Kang et al. describes a method for self-calibrating mismatch and d.c. offset in a mobile transceiver. The transceiver's transmitter is used as a signal generator and the transceiver's receiver is used to measure a response characteristic. A baseband processor calibrates the mismatch and the d.c. offset for the receiving and transmitting sides using a test signal received from the transmitter.

U.S. Pat. No. 7,266,359 to Chen et al. describes a method for removing d.c. interference from a signal received by a communication receiver that removes d.c. offsets induced by the receiver and the transmitter. The method includes removing an estimated d.c. offset from a received signal, correcting a frequency shift in the received signal, estimating a second d.c. offset signal induced by the transmitter, and removing the estimated second d.c. offset from the received signal. The receiver d.c. offset is estimated and removed before performing a timing carrier offset correction using Barker code manipulation to remove receiver d.c. offset and to sum all Barker chips after effectively multiplying Barker codes to correlate to a Barker sequence unaffected by the receiver d.c. offset signal.

U.S. Patent Application Publication No. US 2008/0063113 by Gao et al. describes a method of correcting d.c. offset errors in a transmitter having an OFDMA-based quadrature modulator. A compensator before the modulator compensates the d.c. offset and is updated with estimated d.c. offset values obtained by performing a discrete Fourier transform in the digital baseband domain while sending a pair of orthogonal test tones to the modulator's inputs.

U.S. Patent Application Publication No. US 2009/0041161 by Jian et al. describes a d.c. offset estimation in an OFDMA system that includes a carrier frequency offset estimator receiving an input signal and estimating a carrier frequency offset value, a symbol timing recovery unit providing a symbol boundary of the input signal, and a d.c. offset estimator estimating a d.c. offset value based on the input signal, the carrier frequency offset value, and the symbol boundary.

Despite those and other previous attempts, the problem of d.c. offset estimation remains difficult to solve, and the requirements on an MRX remain difficult to meet.

SUMMARY

This invention enables the I/O d.c. offset in the transmit path to be estimated without prior knowledge of the I/O d.c. offset of the MRX itself. Moreover, this invention enables both the I/O d.c. offset of the transmit path and the I/O d.c. offset of the MRX to be estimated.

In accordance with aspects of this invention, there is provided an apparatus for estimating a d.c. offset in a transmitter having a transmit path for quadrature modulating a carrier with input I and Q component signals and generating a transmit signal. The apparatus includes a measurement receiver, a phase shifter, and an offset estimator. The measurement receiver is configured to demodulate a portion of the transmit signal to generate an I component measurement signal and a Q component measurement signal. The phase shifter is configured to generate a first pair of oscillator signals having a relative phase shift of substantially 90 degrees for quadrature modulation in the transmit path, to generate a second pair of oscillator signals having a relative phase shift of substantially 90 degrees for demodulation in the measurement receiver, and to selectively generate a third pair of oscillator signals having a relative phase shift of substantially 90 degrees and a phase shift with respect to the second pair of oscillator signals for demodulation in the measurement receiver. The offset estimator is configured to compute at least one of a d.c. offset of the transmit path and a d.c. offset of the measurement receiver based on the input I and Q component signals and on measurement I and Q component signals generated with the first and second pairs of oscillator signals.

In other aspects, there is provided a method of estimating a d.c. offset in a transmitter having a transmit signal generated by quadrature mixing input I and Q component signals with respective ones of a transmit pair of oscillator signals having a relative phase shift of substantially 90 degrees. The method includes generating a first pair of measurement I component and Q component measurement signals by demodulating a portion of the transmit signal with the first pair of oscillator signals; generating a second pair of measurement I component and Q component signals by demodulating a portion of the transmit signal with a second pair of oscillator signals having a relative phase shift of substantially 90 degrees and a relative phase shift with respect to the first pair of oscillator signals; and computing the d.c. offset based on the first and second pairs of measurement I and Q component signals and on the input I and Q component signals.

In other aspects, there is provided a computer-readable medium having stored instructions that, when executed by a computer, cause the computer to perform a method of estimating a d.c. offset in a transmitter having a transmit signal generated by quadrature mixing input I and Q component signals with respective ones of a transmit pair of oscillator signals having a relative phase shift of substantially 90 degrees. The method includes generating a first pair of measurement I component and Q component measurement signals by demodulating a portion of the transmit signal with the first pair of oscillator signals; generating a second pair of measurement I component and Q component signals by demodulating a portion of the transmit signal with a second pair of oscillator signals having a relative phase shift of substantially 90 degrees and a relative phase shift with respect to the first pair of oscillator signals; and computing the d.c. offset based on the first and second pairs of measurement I and Q component signals and on the input I and Q component signals.

BRIEF DESCRIPTION OF THE DRAWINGS

The several objects, features, and advantages of this invention will be understood by reading this description in conjunction with the drawings, in which.

DETAILED DESCRIPTION

This invention is applicable to any type of communication system and can be applied in any part of the system, e.g., uplink (UL) or downlink (DL), where d.c.-offset estimation is of interest.

Figure 1:
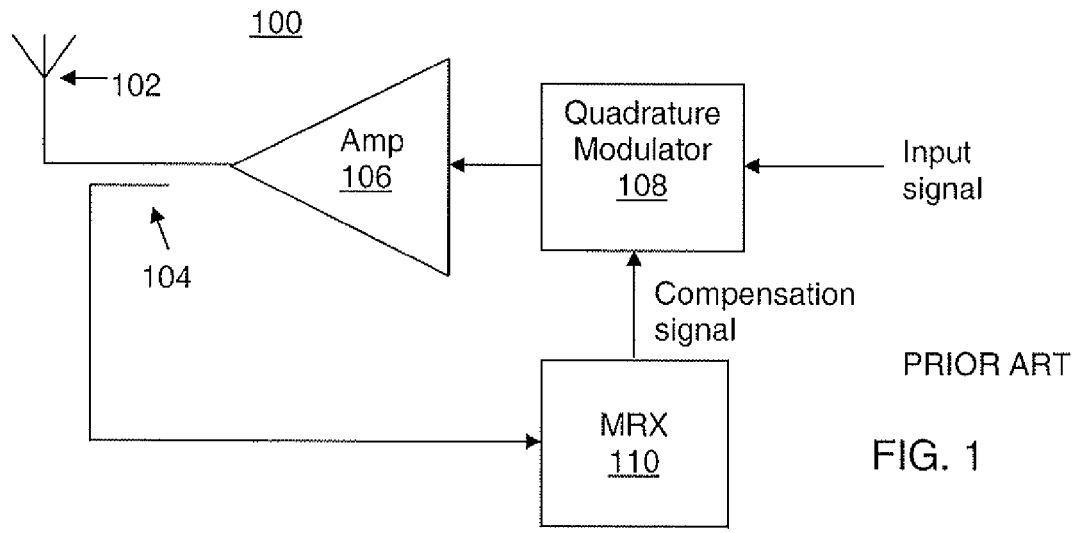
FIG. 1 is a block diagram of transmitter with a measurement receiver.
Figure 2A:
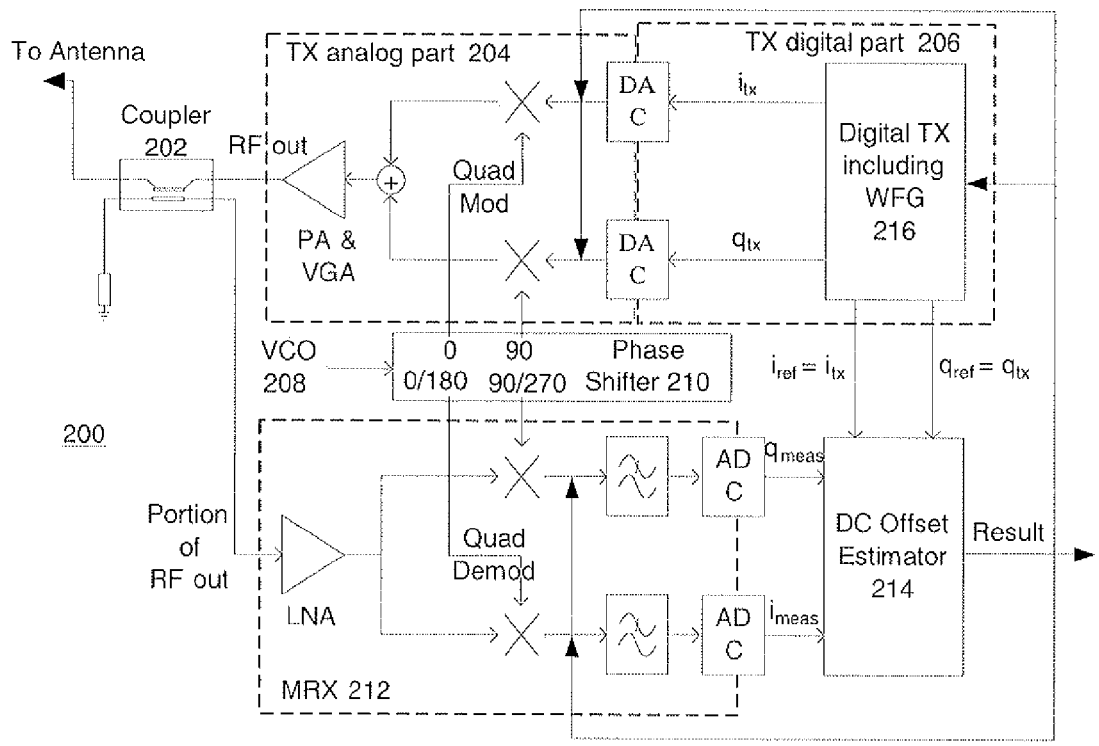
FIGS. 2A, 2B, and 2C are block diagrams of portions of an improved transmitter with a measurement receiver.
Figure 2B:
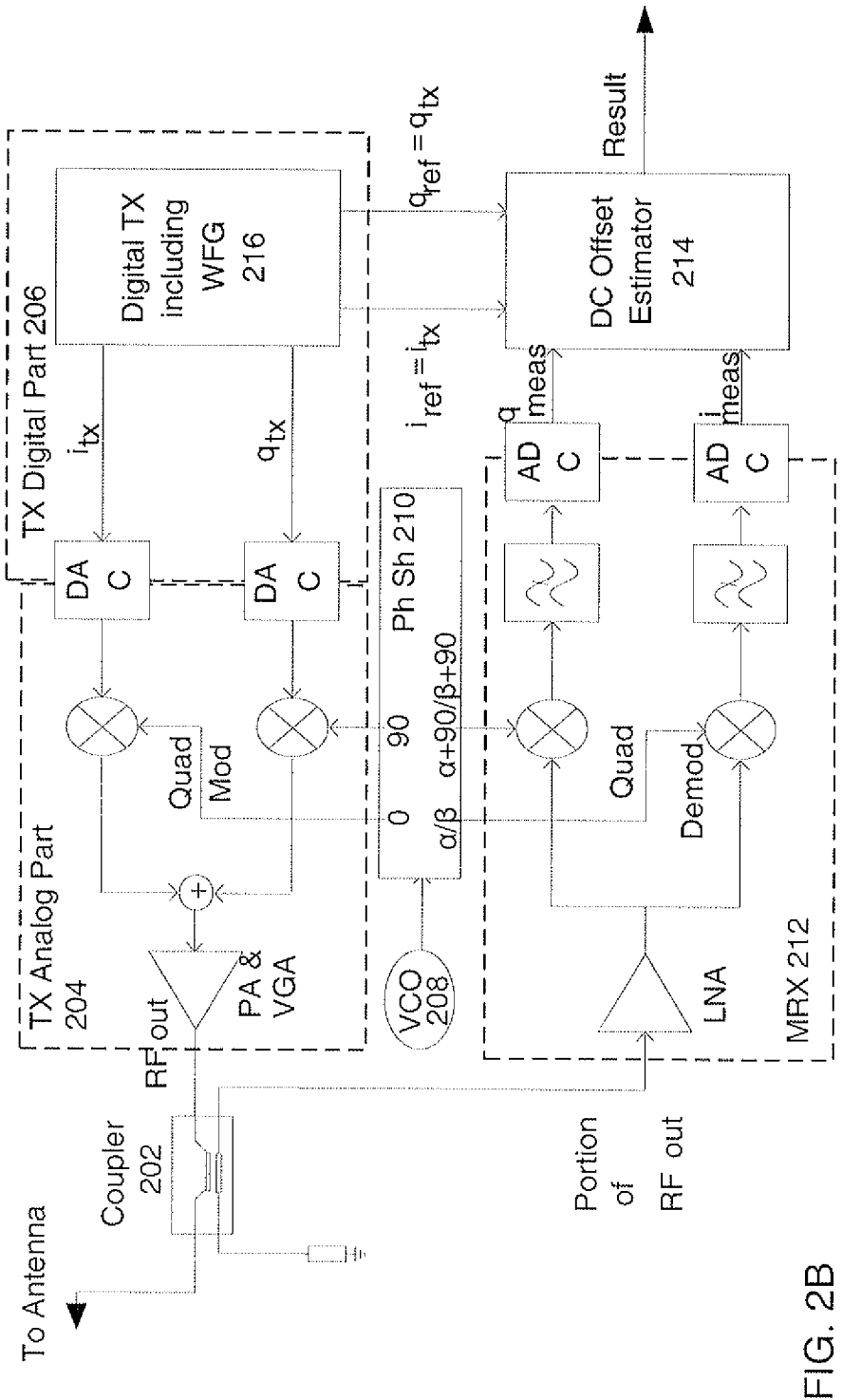
Figure 2C:
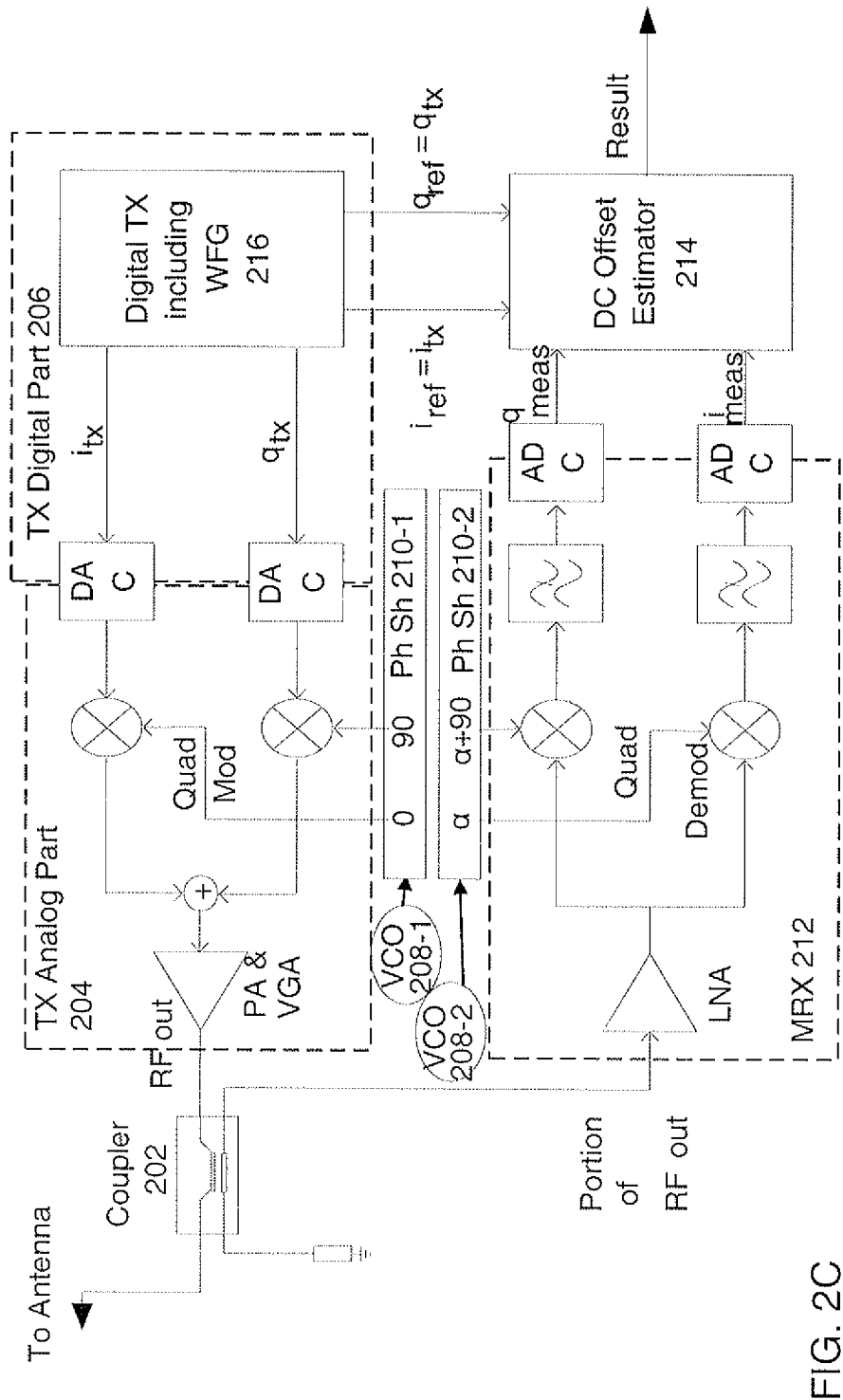

FIGS. 2A, 2B, and 2C are block diagrams of a portion of an improved transmitter 200 with a measurement receiver in accordance with this invention. The transmitter 200 includes a coupler 202, a transmit path that has an analog part 204 and a digital part 206, a voltage-controlled oscillator (VCO) 208, a phase shifter 210, an MRX 212, and an offset estimator 214. As explained in more detail below, the phase shifters 210 in FIGS. 2B and 2C are more generalized than the phase shifter 210 in FIG. 2A. For example, FIG. 2C shows the phase shifter 210 separated into independent portions 210-1, 210-2 that are driven by separate VCOs 208-1, 208-2. In general, however, the portions of the transmitter 200 depicted in FIGS. 2A, 2B, and 2C are substantially the same in other material respects as will be clear from the description.

The digital part 206 of the transmit path includes a digital transmit signal waveform generator (WFG) 216 that produces an in-phase transmit signal $i_{tx}$ and a quadrature transmit signal $q_{tx}$, which are converted to analog form by respective digital-to-analog converters (DACs). The analog part 204 of the transmit path uses the analog transmit signal components produced by the DACs to quadrature-modulate a carrier signal generated by the VCO 208, 208-1 or equivalent local oscillator (LO) in the usual way with two mixers fed respectively by an unshifted and 90-degree shifted LO signal. The phase shifter 210, 210-1 implements the 0-degree and 90-degree phase shifts of the LO signal from VCO 208, 208-1 needed for the quadrature modulation in the transmit path. The modulated carrier is suitably amplified, for example by a power amplifier PA and variable-gain amplifier VGA in the analog part 204, and the complex transmitter output signal is passed to an antenna or other port (not shown) through the coupler 202. For demodulation in the MRX 212 as described below, the phase shifter 210, 210-2 implements the phase shifts of the LO signal from VCO 208, 208-2.

The waveform generator 216 also provides an in-phase reference signal $i_{ref}$ and a quadrature reference signal $q_{ref}$ to the estimator 214. The reference signals $i_{ref}$ and $q_{ref}$ are simply the transmit signals $i_{tx}$ and $q_{tx}$, respectively, and are used by the estimator 214 as described in more detail below. In general, the generator 216 generates signals that are compliant with the applicable modulation type and system standards in terms of data rate, pulse shaping filter, data (IQ) constellation, etc. The artisan will understand that the generator 216 can be implemented in a substantially conventional way, although a relevant aspect of the generator 216 is the time alignment between the signal that is sent ($i_{tx}$ and $q_{tx}$) and the signal that is measured ($i_{ref}$ and $q_{ref}$). In order to ensure a suitable time alignment, the generator 216 can include or implement a suitable variable delay element, or such a delay element can be provided elsewhere in the transmitter 200, to adjust the reference signals with respect to the transmit signal.

As depicted in FIGS. 2A, 2B, 2C, the MRX 212 receives from the coupler 202 a portion of the transmit signal generated by the transmit path. That portion is amplified by a suitable low-noise amplifier LNA and passed to a demodulator that includes two mixers fed by selectively phase-shifted LO signals from the phase shifter 210, 210-2. The downshifted (demodulated) I and Q component signals produced by respective ones of the mixers are low-pass filtered and converted to digital component measurement signals $i_{meas}$ and $q_{meas}$ by respective suitable analog-to-digital converters ADC.

In addition to nominal 0-degree and nominal 90-degree phase shifts used for the quadrature modulator in the analog part 204 and for the demodulator in the MRX 212, the phase shifter 210 depicted in FIG. 2A also generates nominal 180-degree and nominal 270-degree phase shifts of the LO signal for the demodulator in the MRX 212. The MRX 212 performs a first measurement with the "normal" phase shift, i.e., 0 degrees and 90 degrees for the I and Q components, respectively, in the MRX quadrature demodulator, and a second measurement with a "special" phase-shift, i.e., 180 degrees and 270 degrees for the I and Q components, respectively.

As depicted in FIG. 2B, the phase shifter 210 more generally generates LO signals having nominal α-degree and nominal (α+90)-degree phase shifts as the "normal" phase shift for the MRX demodulator, or having nominal β-degree and nominal (β+90)-degree phase shifts as the "special" phase shift for the MRX demodulator. Of course, the arrangements depicted in FIGS. 2A and 2B are interchangeable, and it is easy to see that when α=0 degrees and β=180 degrees, the arrangements are the same.

Moreover, although FIGS. 2A, 2B depict the selective phase shifts as generated by the phase shifter 210, it should be understood that the VCO 208 can contribute to their generation by selectively changing the phase of its output signal provided to the phase shifter. In that way, the VCO 208 can be considered as just a part of the phase shifter 210. The VCO signal can be provided such that the phase relations of the LO signals provided to the MRX 212 are as described but are simply rotated by a possibly arbitrary but substantially the same amount with respect to the LO signals provided to the TX analog part 204.

Such an arrangement is depicted in FIG. 2C, which shows the phase shifter 210-2 generates LO signals that have nominal α-degree and nominal (α+90)-degree phase shifts as the "normal" phase shift for the MRX demodulator. The "normal" phase shift is based on a VCO signal having a first phase, which may be called $\phi_1$, that is provided by the VCO 208-2. The phase shifter 210-2 also generates the "special" phase shift LOs for the MRX demodulator based on the VCO signal having a second phase, which may be called $\phi_2$, provided by the VCO 208-2. Of course, it can be seen that when $\phi_2-\phi_1=180$ degrees, the arrangements depicted in FIGS. 2A, 2B, and 2C are substantially the same.

It is currently preferred that the phase shifter 210 generates the shifts in successive pairs for particular time intervals, but it will be noted that the phase shifter 210 can be configured to provide four continuous outputs to the MRX 212, which could then have two parallel demodulators, each comprising two mixers, generating four continuous measurement signal components. Although such an arrangement has some advantages, it requires extra physical space, more power, and careful matching of the pairs of mixers.

In general, using the MRX 212 as little as possible is desirable in order to save power, which can be important in a battery-powered transmitter. It is currently expected that the MRX would be used for periods of 25-50 microseconds, with an approximately 50% duty cycle of the 0/180 and 90/270 phase shifts, which of course are synchronized to the transmit path because the transmit and MRX measurement signals have to be time-aligned as noted above. It is also currently expected that the noisiness of the MRX measurement signals should be reduced by suitable smoothing, for example by low-pass filters, resettable integrators, or simply averaging. It will be noted that the equations given below are in terms of discrete signal samples, and do not include such smoothing, which can be implemented in many suitable ways, for example by software programming in the offset estimator 214.

The combination of the phase shifter 210, MRX 212, and offset estimator 214 (and VCO 208-1, 208-2) as described above, enables the d.c. offset in the transmit path, comprising the analog and digital parts 204, 206, to be distinguished from the d.c. offset in the MRX 212. The estimator 214, which may be a suitably programmed digital processor or collection of logic gates, can compute either or both of the d.c. offsets according to the following equations and provide the computed offsets as results that can be used by other components in the transmitter 200.

As depicted in FIGS. 2A, 2B, 2C, an offset result generated by the estimator 214, which is an estimate of the d.c. offset, can be fed back to manipulate either the analog or digital parts 204, 206 or the MRX 212. (For clarity, the feedback paths are not shown in FIGS. 2B, 2C.) For example, the offset result can be fed back to the transmit digital part 206 by providing the result to the transmit generator 216, which can then compensate the transmit signals $i_{tx}$, $q_{tx}$ it generates based on the offset result. Such compensation can include simply adding the offset result to the transmit signals either in the generator 216 by including suitable adders (not shown for clarity) external to the generator 216. For another example, the offset result can be combined with the analog transmit signals in the analog part 204 by suitable adders included before the mixers of the quadrature modulator. An offset result generated by the estimator 214 can also or instead be fed back to the MRX 212 as depicted in FIGS. 2A, 2B, 2C through suitable adders included after the mixers in the quadrature demodulator. Also as depicted in FIGS. 2A, 2B, 2C, the offset result generated by the estimator 214 can be provided to other components (not shown) in the transmitter 200, for example, for inclusion in a report message.

Figure 3:
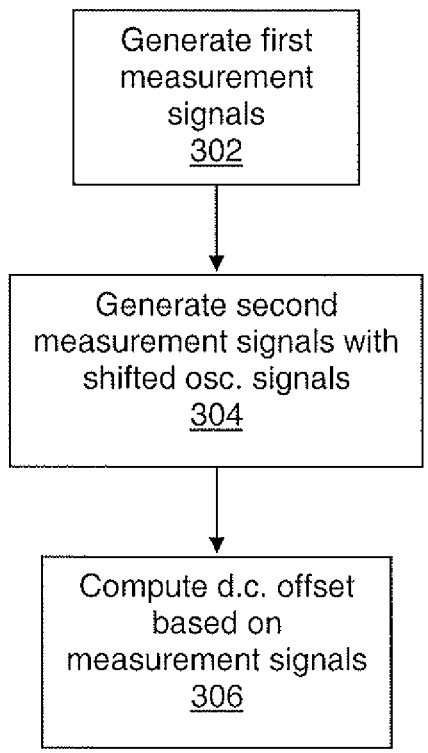
FIG. 3 is a flow chart of method of d.c. offset estimation.

Thus, FIG. 3 is a flow chart of a method of estimating a d.c. offset in a transmitter having a transmit signal generated by quadrature mixing input I and Q component signals with respective ones of a first pair of oscillator signals having a relative phase shift of substantially 90 degrees, e.g., 0-degree and 90-degree signals coming from the phase shifter 210. In step 302, a first pair of measurement I component and Q component measurement signals, such as $i_{meas}$ and $q_{meas}$ described above, is generated by quadrature demodulating a portion of the transmit signal with a second pair of oscillator signals, e.g., α-degree and (α+90)-degree or 0-degree and 90-degree signals coming from the phase shifter 210, 210-2. In step 304, a second pair of measurement I component and Q component signals is generated by quadrature demodulating a portion of the transmit signal with a third pair of oscillator signals having a relative phase shift of substantially 90 degrees and a relative phase shift with respect to the second pair of oscillator signals, e.g., β-degree and (β+90)-degree or 180-degree and 270-degree signals from the phase shifter 210, 210-2. As described above, generating the second and third pairs of oscillator signals can be done by alternating the phase of the output signal produced by the VCO 208-2. As seen in FIG. 2A, the relative phase shift of the third pair with respect to the second pair can be substantially 180 degrees, which is to say that β≈α+180 degrees. In step 306, the d.c. offset is computed based on the first and second pairs of measurement I and Q component signals and on the input I and Q component signals.

It should be understood that the following mathematical analysis is applicable whenever β≈α+180 degrees (e.g., in the arrangement depicted in FIG. 2B) or whenever $\phi_2 \approx \phi_1+180$ degrees (e.g., in the arrangement depicted in FIG. 2C).

The complex transmitter output signal including d.c. offset of the transmit path can be written as follows:

$$z_{TX} = i_{ref} + q_{ref} + z_{DC,TX} = i_{ref} + q_{ref} + i_{DC,TX} + q_{DC,TX} \qquad \text{Eq. 1}$$

in which $z_{TX}$ is the transmitter output signal, $i_{ref}$ is an I channel reference, $q_{ref}$ is a Q channel reference, and $z_{DC,TX}$ is the d.c. offset of the transmit path, which can be separated as shown into d.c. offsets of the I and Q components of the transmit path, $i_{DC,TX}$ and $q_{DC,TX}$, respectively.

In a similar way, the complex output signal including d.c. offset of the MRX 212 can be written as follows:

$$z_{MRX} = i_{meas} + q_{meas} \quad \text{Eq. 2}$$

in which $z_{MRX}$ is the MRX output signal, $i_{meas}$ is the I channel signal measured by the MRX 212, and $q_{meas}$ is the Q channel signal measured by the MRX 212. The combined d.c. offset $z_{DC,tot}$ of the transmit path and the MRX 212 can be written as follows:

$$x_{DC,tot} = z_{DC,TX} + z_{DC,MRX} = i_{DC,TX} + q_{DC,TX} + i_{DC,MRX} + q_{DC,MRX} \quad \text{Eq. 3}$$

in which $z_{DC,MRX}$ is the d.c. offset of the MRX 212 and the other parameters are as defined above.

With the usual 0-degree and 90-degree phase shifts in the transmit path and MRX 212, the I-channel and Q-channel measurement signals generated by the MRX 212 can be written as follows:

$$i_{meas} = i_{ref} + i_{DC,MRX} + i_{DC,TX} \quad \text{Eq. 4}$$

$$q_{meas} = q_{ref} + q_{DC,MRX} + q_{DC,TX} \quad \text{Eq. 5}$$

and with the "special" 180-degree and 270-degree phase shifts in the MRX 212, the I-channel and Q-channel measurement signals generated by the MRX 212 can be written as follows:

$$\hat{i}_{meas} = -i_{ref} + i_{DC,MRX} - i_{DC,TX} \quad \text{Eq. 6}$$

$$\hat{q}_{meas} = -q_{ref} + q_{DC,MRX} - q_{DC,TX} \quad \text{Eq. 7}$$

in which the "hat" indicates the "special" phase shifts.

Adding Eq. 4 and Eq. 6 yields the following:

$$i_{meas} + \hat{i}_{meas} = 2 i_{DC,MRX} \quad \text{Eq. 8A}$$

which can be re-arranged to give the I-channel d.c. offset of the MRX 212 as follows:

$$i_{DC,MRX} = \frac{i_{meas} + \hat{i}_{meas}}{2} \quad \text{Eq. 8B}$$

In a similar way, adding Eq. 5 and Eq. 7 yields the following:

$$q_{meas} + \hat{q}_{meas} = 2 q_{DC,MRX} \quad \text{Eq. 9A}$$

which can be re-arranged to give the Q-channel d.c. offset of the MRX 212 as follows:

$$q_{DC,MRX} = \frac{q_{meas} + \hat{q}_{meas}}{2} \quad \text{Eq. 9B}$$

Subtracting Eq. 6 from Eq. 4 yields the following:

$$i_{meas} - \hat{i}_{meas} = 2 i_{ref} + 2 i_{DC,TX} \quad \text{Eq. 10A}$$

which can be re-arranged to give the I-channel d.c. offset of the transmit path as follows:

$$i_{DC,TX} = \frac{i_{meas} - \hat{i}_{meas} - 2 i_{ref}}{2} \quad \text{Eq. 10B}$$

In a similar way, subtracting Eq. 7 from Eq. 5 yields the following:

$$q_{meas} - \hat{q}_{meas} = 2 q_{ref} + 2 q_{DC,TX} \quad \text{Eq. 11A}$$

which can be re-arranged to give the Q-channel d.c. offset of the transmit path as follows:

$$q_{DC,TX} = \frac{q_{meas} - \hat{q}_{meas} - 2 q_{ref}}{2} \quad \text{Eq. 11B}$$

The offset estimator 214 can compute the individual d.c. offsets of the transmit path and the MRX 212 using Eqs. 8B, 9B, 10B, and 11B. The equations are more complicated when a phase shifter as depicted in FIG. 2B is used and α and β are not 0 and 180 degrees, respectively, but the offset estimator 214 can still compute the individual d.c. offsets of the transmit path and the MRX 212.

The estimator 214 and various other functional blocks of the transmitter 200 can be implemented by one or more suitably programmed electronic processors, collections of logic gates, etc. that process information stored in one or more memories. The stored information may include program instructions and data that enable the estimator 214 to implement the equations described above.

Figure 4:
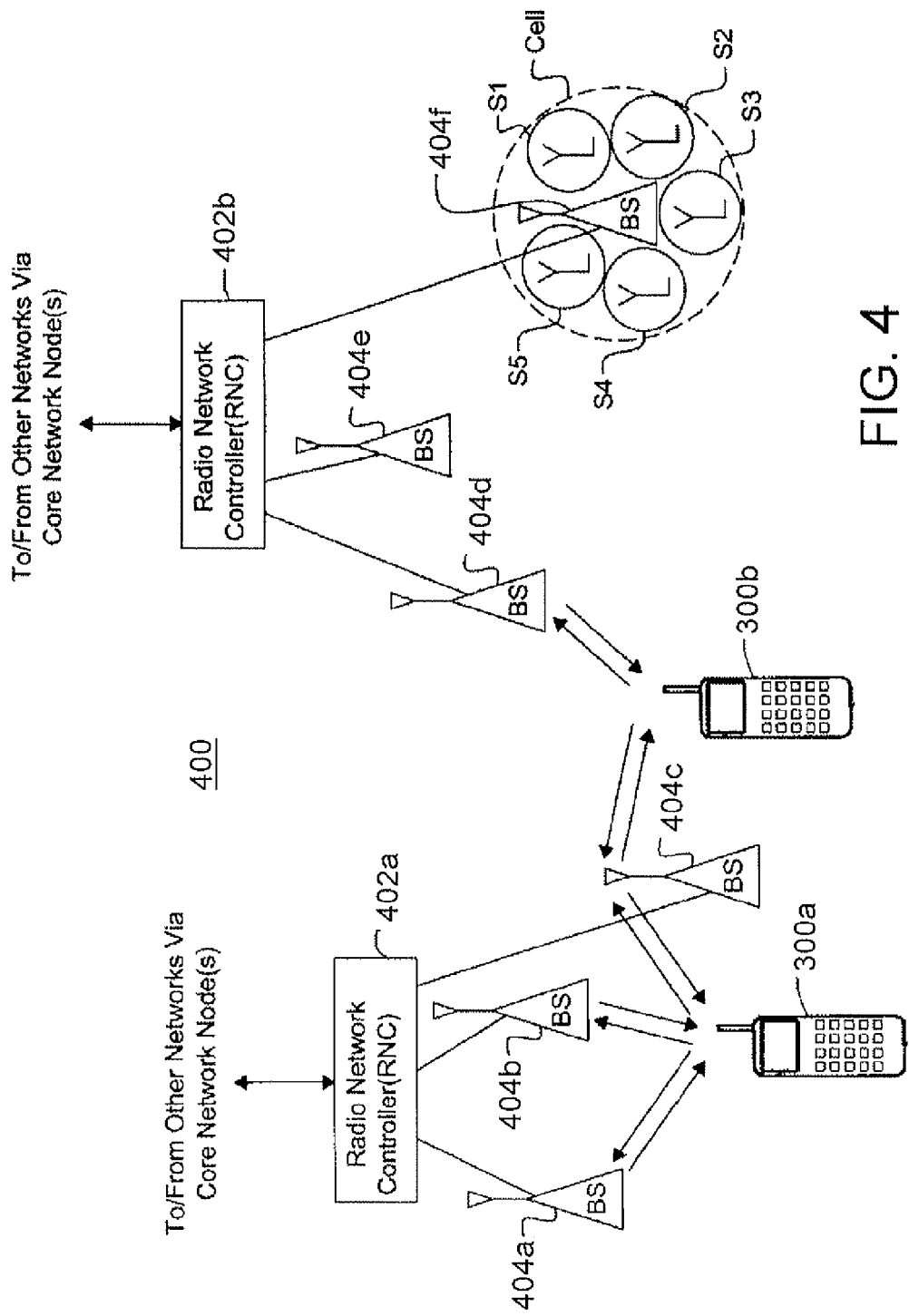
FIG. 4 depicts a communication network.

FIG. 4 is a diagram of an exemplary communication network 400, which may be, for example, a WCDMA communication system. Radio network controllers (RNCs) 402a, 402b control various radio network functions, including for example radio access bearer setup, diversity handover, etc. More generally, each RNC directs user calls via the appropriate RBSs, which communicate with user equipments (UEs) 300a, 300b through downlink (i.e., base-to-mobile, or forward) and uplink (i.e., mobile-to-base, or reverse) channels. RNC 402a is shown coupled to RBSs 404a, 404b, 404c, and RNC 402b is shown coupled to RBSs 404d, 404e, 404f. Each RBS, which can also be called a NodeB, serves a geographical area that can be divided into one or more cell(s). RBS 404f is shown as having five antenna sectors S1-S5, all or some of which can be said to make up the cell of the RBS 404f. The RBSs are coupled to their corresponding RNCs by dedicated telephone lines, optical fiber links, microwave links, etc. Both RNCs 402a, 402b are typically connected with external networks such as the public switched telephone network (PSTN), the Internet, etc. through one or more core network nodes, such as a mobile switching center and/or a packet radio service node (not shown). The artisan will understand that the components and arrangement depicted in FIG. 4 are examples and should not be construed as limiting the components and arrangement of an actual communication system.

Figure 5:
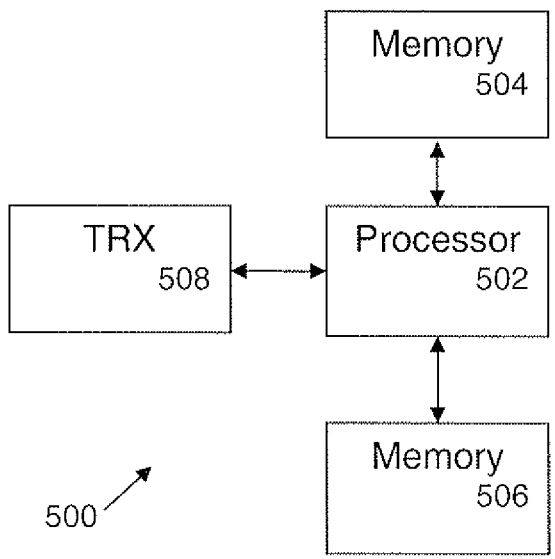
FIG. 5 is a block diagram of a user equipment for the communication network.

FIG. 5 depicts a communication device 500, such as a mobile telephone, remote terminal, or equivalent device, that can communicate through a wireless link with a base station in a communication network. The device 500 can be a UE 300 in the network 400. Among other things, the UE 500 includes one or more programmable processors 502 or suitable logic that processes information stored in one or more memories 504, 506. The stored information may include, among other things, program instructions for computing the d.c. offsets as described above. It will be appreciated that the processor 502 typically includes timers, etc. that facilitate its operations. Transceiver (TRX) circuitry 508 provides for the reception and transmission of control and traffic signals on the link between the UE 500 and the base station, which can include similar transceiver circuitry. The TRX 508 includes the transmitter portion 200 described above that operates under the control of the processor 502.

It is expected that this invention can be implemented in a wide variety of environments, including for example mobile communication devices. It will be appreciated that procedures described above are carried out repetitively as necessary. To facilitate understanding, many aspects of the invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Many communication devices can easily carry out the computations and determinations described here with their programmable processors and application-specific integrated circuits.

Moreover, the invention described here can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a RAM, a ROM, an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. An apparatus for estimating a direct-current (d.c.) offset in a transmitter having a transmit path for quadrature modulating a carrier with input in-phase (I) and quadrature (Q) component signals and generating a transmit signal, the apparatus comprising:
a measurement receiver, wherein the measurement receiver is configured to demodulate a portion of the transmit signal to generate an I component measurement signal and a Q component measurement signal;
a phase shifter, wherein the phase shifter is configured to generate a first pair of oscillator signals having a relative phase shift of about 90 degrees for quadrature modulation in the transmit path, to generate a second pair of oscillator signals having a relative phase shift of about 90 degrees for demodulation in the measurement receiver, and to selectively generate a third pair of oscillator signals having a relative phase shift of about 90 degrees and a phase shift with respect to the second pair of oscillator signals for demodulation in the measurement receiver; and an offset estimator, wherein the offset estimator is configured to compute at least one of a d.c. offset of the transmit path and a d.c. offset of the measurement receiver based on the input I and Q component signals and on measurement I and Q component signals generated with the pairs of oscillator signals.

2. The apparatus of claim 1, wherein the phase shifter is configured for at least one of a phase shift of about 180 degrees between the third pair of oscillator signals and the second pair of oscillator signals and a phase shift of about 0 degrees between the first pair of oscillator signals and the second pair of oscillator signals.

3. The apparatus of claim 1, wherein the phase shifter is configured to generate the second and third pairs of oscillator signals by alternating a phase of a controllable oscillator signal.

4. The apparatus of claim 2, wherein the offset estimator is configured to compute an I component d.c. offset of the measurement receiver according to:

$$i_{DC,MRX} = \frac{i_{meas} + \hat{i}_{meas}}{2}$$

in which $i_{DC,MRX}$ is the I component of the d.c. offset of the measurement receiver, $i_{meas}$ is the measurement I component signal generated with one of the second pair of oscillator signals, and $\hat{i}_{eas}$ is the measurement I component signal generated with one of the third pair of oscillator signals having a 180-degree phase shift with respect to the one of the second pair of oscillator signals; and the offset estimator is configured to compute a Q component d.c. offset of the measurement receiver according to:

$$q_{DC,MRX} = \frac{q_{meas} + \hat{q}_{meas}}{2}$$

in which $q_{DC,MRX}$ is the Q component of the d.c. offset of the measurement receiver, meas is the measurement Q component signal generated with the other one of the second pair of oscillator signals, and $\hat{q}_{meas}$ is the measurement Q component signal generated with the other one of the third pair of oscillator signals.

5. The apparatus of claim 1, wherein the offset estimator is configured to compute an I component d.c. offset of the transmit path according to:

$$i_{DC,TX} = \frac{i_{meas} - \hat{i}_{meas} - 2i_{ref}}{2}$$

in which $i_{DC,TX}$ is the I component of the d.c. offset of the transmit path, $i_{meas}$ is the measurement I component signal generated with one of the first pair of oscillator signals, $\hat{i}_{meas}$ is the measurement I component signal generated with one of the second pair of oscillator signals having a 180-degree phase shift with respect to the one of the first pair of oscillator signals, and $i_{ref}$ is the I component signal; and the offset estimator is configured to compute a Q component d.c. offset of the transmit path according to:

$$q_{DC,TX} = \frac{q_{meas} - \hat{q}_{meas} - 2q_{ref}}{2}$$

in which $q_{DC,TX}$ is the Q component of the d.c. offset of the transmit path, $q_{meas}$ is the Q component measurement signal generated with the other one of the first pair of oscillator signals, $\hat{q}_{meas}$ is the measurement Q component signal generated with the other one of the second pair of oscillator signals, and $q_{ref}$ is the Q component signal.

6. A method of estimating a direct-current (d.c.) offset in a transmitter having a transmit signal generated by mixing input in-phase (I) and quadrature (Q) component signals with respective ones of a transmit pair of oscillator signals having a relative phase shift of about 90 degrees, the method comprising:
generating the transmit pair of oscillator signals having the relative phase shift of about 90 degrees;
generating a first pair of measurement I component and Q component measurement signals by demodulating a portion of the transmit signal with a first pair of oscillator signals having a relative phase shift of about 90 degrees;
generating a second pair of measurement I component and Q component signals by demodulating a portion of the transmit signal with a second pair of oscillator signals having a relative phase shift of about 90 degrees and a relative phase shift with respect to the first pair of oscillator signals; and
computing the d.c. offset based on the first and second pairs of measurement I and Q component signals and on the input I and Q component signals.

7. The method of claim 6, wherein the relative phase shift between the first and second pairs of oscillator signals is about 180 degrees.

8. The method of claim 6, wherein the first and second pairs of oscillator signals are generated by alternating a phase of a controllable oscillator signal.

9. The method of claim 7, wherein computing the d.c. offset includes computing an I component d.c. offset according to:

$$i_{DC,MRX} = \frac{i_{meas} + \hat{i}_{meas}}{2}$$

in which $i_{DC,MRX}$ is the I component d.c. offset, $i_{meas}$ is the measurement I component signal generated with one of the first pair of oscillator signals, and $\hat{i}_{meas}$ is the measurement I component signal generated with one of the second pair of oscillator signals having a 180-degree phase shift with respect to the one of the first pair of oscillator signals; and computing the d.c. offset includes computing a Q component d.c. offset according to:

$$q_{DC,MRX} = \frac{q_{meas} + \hat{q}_{meas}}{2}$$

in which $q_{DC,MRX}$ is the Q component d.c. offset, n the measurement Q component $\hat{q}_{meas}$ is signal generated with the other one of the first pair of oscillator signals, and $i_{meas}$ is the measurement Q component signal generated with the other one of the second pair of oscillator signals.

10. The method of claim 6, wherein computing the d.c. offset includes computing an I component d.c. offset of the transmit path according to:

$$i_{DC,TX} = \frac{i_{meas} - \hat{i}_{meas} - 2i_{ref}}{2}$$

in which $i_{DC,TX}$ is the I component of the d.c. offset of the transmit path, $i_{meas}$ is the measurement I component signal generated with one of the first pair of oscillator signals, $\hat{i}_{meas}$ is the measurement I component signal generated with one of the second pair of oscillator signals having a 180-degree phase shift with respect to the one of the first pair of oscillator signals, and $i_{ref}$ is the I component signal; and computing the d.c. offset includes computing a Q component d.c. offset of the transmit path according to:

$$q_{DC,TX} = \frac{q_{meas} - \hat{q}_{meas} - 2q_{ref}}{2}$$

in which $q_{DC,TX}$ is the Q component of the d.c. offset of the transmit path, $q_{meas}$ is the Q component measurement signal generated with the other one of the first pair of oscillator signals, q̂meas is the measurement Q component signal generated with the other one of the second pair of oscillator signals, and $q_{ref}$ is the Q component signal.

11. A non-transitory computer-readable medium having stored instructions that, when executed by a computer, cause the computer to perform a method of estimating a direct-current (d.c.) offset in a transmitter having a transmit signal generated by quadrature mixing input in-phase (I) and quadrature (Q) component signals with respective ones of a transmit pair of oscillator signals having a relative phase shift of about 90 degrees, wherein the method comprises:
generating the transmit pair of oscillator signals having the relative phase shift of about 90 degrees;
generating a first pair of measurement I component and Q component measurement signals by demodulating a portion of the transmit signal with a first pair of oscillator signals having a relative phase shift of about 90 degrees;
generating a second pair of measurement I component and Q component signals by demodulating a portion of the transmit signal with a second pair of oscillator signals having a relative phase shift of about 90 degrees and a relative phase shift with respect to the first pair of oscillator signals; and
computing the d.c. offset based on the first and second pairs of measurement I and Q component signals and on the input I and Q component signals.

12. The medium of claim 11, wherein the relative phase shift between the first and second pairs of oscillator signals is about 180 degrees.

13. The medium of claim 11, wherein the first and second pairs of oscillator signals are generated by alternating a phase of a controllable oscillator signal.

14. The medium of claim 12, wherein computing the d.c. offset includes computing an I component d.c. offset according to:

$$i_{DC,MRX} = \frac{i_{meas} + \hat{i}_{meas}}{2}$$

in which $i_{DC,MRX}$ is the I component d.c. offset, $i_{meas}$ the measurement I component (meas is signal generated with one of the first pair of oscillator signals, and $\hat{i}_{meas}$ is the measurement I component signal generated with one of the second pair of oscillator signals having a 180-degree phase shift with respect to the one of the first pair of oscillator signals; and computing the d.c. offset includes computing a Q component d.c. offset according to:

$$q_{DC,MRX} = \frac{q_{meas} + \hat{q}_{meas}}{2}$$

in which $q_{DC,MRX}$ is the Q component d.c. offset, $q_{meas}$ is the measurement Q component signal generated with the other one of the first pair of oscillator signals, and $\hat{q}_{meas}$ is the measurement Q component signal generated with the other one of the second pair of oscillator signals.

15. The medium of claim 12, wherein computing the d.c. offset includes computing an I component d.c. offset of the transmit path according to:

$$i_{DC,TX} = \frac{i_{meas} - \hat{i}_{meas} - 2i_{ref}}{2}$$

in which $i_{DC,TX}$ is the I component of the d.c. offset of the transmit path, $i_{meas}$ is the measurement I component signal generated with one of the first pair of oscillator signals, $\hat{i}_{meas}$ is the measurement I component signal generated with one of the second pair of oscillator signals having a 180-degree phase shift with respect to the one of the first pair of oscillator signals, and $i_{ref}$ is the I component signal; and computing the d.c. offset includes computing a Q component d.c. offset of the transmit path according to:

$$q_{DC,TX} = \frac{q_{meas} - \hat{q}_{meas} - 2q_{ref}}{2}$$

in which $q_{DC,TX}$ is the Q component of the d.c. offset of the transmit path, $q_{meas}$ is the Q component measurement signal generated with the other one of the first pair of oscillator signals, $\hat{q}_{meas}$ is the measurement Q component signal generated with the other one of the second pair of oscillator signals, and $q_{ref}$ is the Q component signal.

* * * * *